(12) United States Patent
Petridis et al.

(10) Patent No.: US 7,867,133 B2
(45) Date of Patent: Jan. 11, 2011

(54) INCREASED LOADING TO IMPROVE LOW LOAD CONTROLLED AUTO-IGNITION OPERATION

(75) Inventors: Themi Philemon Petridis, London (GB); Jonathan O'neill, Erith (GB); Harald Stoffels, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 865 days.

(21) Appl. No.: 11/351,540

(22) Filed: Feb. 10, 2006

(65) Prior Publication Data
US 2007/0191183 A1 Aug. 16, 2007

(51) Int. Cl.
*B60W 20/00* (2006.01)
*B60W 10/04* (2006.01)
*B60K 1/02* (2006.01)

(52) U.S. Cl. .................. 477/3; 477/107; 180/65.28
(58) Field of Classification Search .............. 477/107; 180/65.28
See application file for complete search history.

(56) References Cited

U.S. PATENT DOCUMENTS

| 5,806,617 | A * | 9/1998 | Yamaguchi ............ 180/65.235 |
| 6,286,482 | B1 | 9/2001 | Flynn et al. |
| 6,536,407 | B1 | 3/2003 | Denbratt |
| 6,564,545 | B1 | 5/2003 | Dong |
| 6,585,621 | B2 * | 7/2003 | Matthews et al. ............ 477/115 |
| 6,636,797 | B2 | 10/2003 | Yoshizawa et al. |
| 6,932,175 | B2 | 8/2005 | Teraji et al. |
| 7,373,917 | B2 * | 5/2008 | Ellinger et al. .............. 123/295 |
| 2004/0106494 | A1 * | 6/2004 | Bhavsar et al. ................. 477/2 |
| 2006/0169245 | A1 * | 8/2006 | Zillmer et al. .............. 123/299 |
| 2007/0062486 | A1 * | 3/2007 | Yang ......................... 123/305 |
| 2007/0204830 | A1 * | 9/2007 | Andri ..................... 123/198 F |
| 2007/0205029 | A1 * | 9/2007 | Leone et al. ............... 180/65.2 |
| 2007/0240920 | A1 * | 10/2007 | Holmes et al. ............. 180/65.2 |

FOREIGN PATENT DOCUMENTS

EP 1801386 A1 * 6/2007

* cited by examiner

*Primary Examiner*—Roger Pang
(74) *Attorney, Agent, or Firm*—Allan J. Lippa; Alleman Hall McCoy Russell & Tuttle LLP

(57) ABSTRACT

A method for controlling an engine and a supplemental torque apparatus of a vehicle, such as a hybrid vehicle. During a transient gear change where the engine temporarily encounters a low load and low speed operating condition, the system increases loading on the engine via the supplemental torque apparatus so that a cylinder can continue auto-ignition combustion.

20 Claims, 4 Drawing Sheets

INCREASED LOADING TO IMPROVE LOW LOAD CONTROLLED AUTO-IGNITION OPERATION

BACKGROUND AND SUMMARY

Vehicles may use various types of combustion modes in combination with a hybrid powertrain to achieve improved vehicle efficiency.

One example is described in U.S. publication 20050173169, which uses a homogeneous charge compression ignition combustion (HCCI) engine as one form of the auto-ignition operation. In this system, power production from the HCCI engine in operation may be decoupled from, or assist in, responding to driver power demand. When a driver power demand is greater than what can be provided by the HCCI engine, the addition of power from the powertrain's reversible secondary power source (e.g. one or more reversible electric motor/generator(s) or reversible hydraulic pump/motor(s)) is used. Likewise, when a driver power demand is less than a value produced by the engine, a portion of power is converted into storable energy for storage in an energy storage device.

The inventors herein have recognized a disadvantage with such an approach. In particular, while driver demand may be one influence on engine operation and use of a supplemental power source to supply or store energy, various transient conditions may occur even when a driver demanded response is changing slowly or not at all. For example, during a transmission gear change, required engine output may vary dramatically and may increase and/or decrease below a value that can be provided via an engine operating with at least one cylinder carrying out compression ignition.

As such, in one example, a method for controlling an engine and a supplemental torque apparatus of a vehicle, the vehicle having a transmission coupled to the engine, may be used. The method comprises operating at least one cylinder with at least partial auto-ignition combustion; and during a transient gear change where the engine temporarily encounters a low load and low speed operating condition, increasing loading on the engine via the supplemental torque apparatus so that the at least one cylinder may remain operating with at least partial auto-ignition combustion.

In this way, it is possible to compensate for conditions other than the requested drive torque that may affect the appropriate selection of supplemental torque and engine torque in an engine carrying out auto-ignition operation. For example, during a transmission gear change which may otherwise cause the engine to operate in a low speed and/or low load condition beyond that in which auto-ignition operation is feasible, the engine may avoid or reduce transitions in the combustion mode by utilizing the supplemental torque apparatus to increase the effective engine load without adversely affecting the vehicle drive torque that the driver has requested.

Note that various terms for auto-ignition may be used, such as homogenous charge compression ignition, or controlled auto-ignition, or partial HCCI operation, etc. Note also that the low speed and low load thresholds may be a function of various operating conditions and engine/vehicle design parameters.

DETAILED DESCRIPTION

Figure 1:
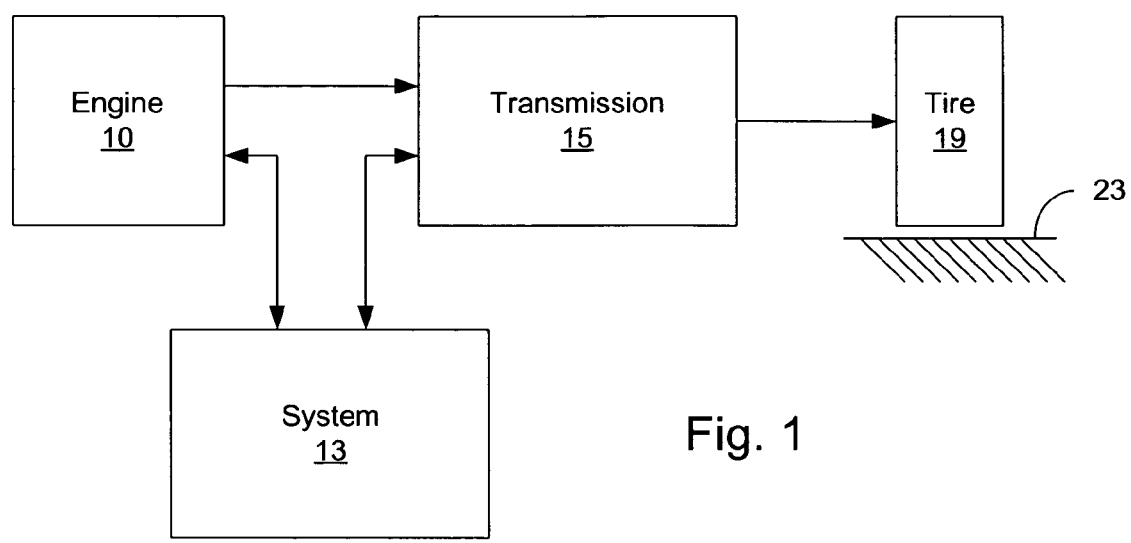
FIG. 1 is a schematic of a vehicle according to the present description.
Figure 2:
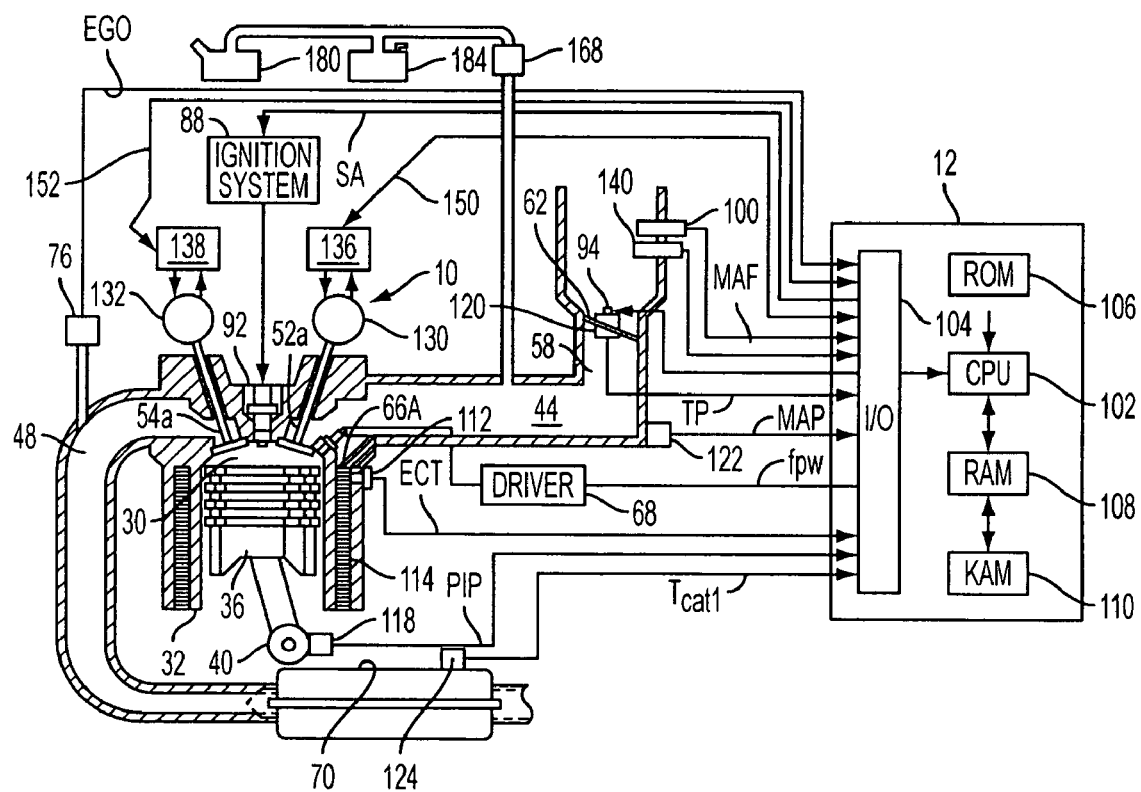
FIG. 2 is a schematic depiction of an internal combustion engine.

Referring to FIG. 1, internal combustion engine 10, further described herein with particular reference to FIG. 2, is shown coupled to transmission 15. The transmission 15 may be a manual transmission, automatic transmission, or combinations thereof. Further, various additional components may be included, such as a torque converter, and/or other gears such as a final drive unit, etc.

In this example embodiment, the powertrain also includes an electrical alternator/charging system 13. System 13 may be an alternator that may be operated to store energy in a battery and/or supply electrical energy to an electrical system of the vehicle, which may include traction motors for driving the vehicle in one example. Alternatively, the alternator may be coupled to a motor that supplies and/or absorbs torque from the engine. Still further, other system configurations may be used.

The depicted connections between engine 10, system 13, transmission 15 and tire 19 indicate transmission of mechanical energy from one component to another. For example, torque may be transmitted from engine 10 to drive the vehicle wheels and tire 19 via transmission 15. System 13 may be configured to operate in a generator mode and/or a motor mode. In a generator mode, system 13 absorbs some or all of the output from engine 10 and/or transmission 15, which reduces the amount of drive output delivered to the tire 19, or the amount of braking torque to the tire 19. Such operation may be employed, for example, to achieve efficiency gains through regenerative braking, improved engine efficiency, etc. Further, the output received by system 13 may be used to charge a battery or other energy storage device. In motor mode, the system may supply mechanical output to engine 10 and/or transmission 15, for example by using electrical energy stored during generator operation.

Hybrid propulsion embodiments may include full hybrid systems, in which the vehicle can run on just the engine, just the hybrid propulsion system, or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used.

FIG. 2 shows one cylinder of a multi-cylinder engine, as well as the intake and exhaust path connected to that cylinder. Continuing with FIG. 2, direct injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via electronic driver 68. The fuel injector may be mounted in the side of the combustion chamber or in the top of the combustion chamber, for example. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Ignition system 88 provides an ignition spark to combustion chamber 30 via spark plug 92 in response to spark advance signal SA from controller 12, under select operating modes. Though spark ignition components are shown, engine 10 (or a portion of the cylinders thereof) may be operated in a compression ignition mode, with or without spark assistance (and an additional injection to assist in commencing auto-ignition by raising cylinder temperature). Further, in an alternative embodiment, the combustion chamber has no spark plug.

Controller 12 may be configured to cause combustion chamber 30 to operate in various combustion modes, as described herein. The fuel injection timing may be varied to provide different combustion modes, along with other parameters, such as EGR, valve timing, valve operation, valve deactivation, etc.

The example exhaust emission control device 70 represents one or more catalytic devices, such as three way catalyst, NOx traps, etc. that may be used.

Controller 12 is shown in FIG. 2 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect (or other type) sensor 118 coupled to crankshaft 40; and throttle position, TP, from throttle position sensor 120; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature Tcat1 of device 70 may be inferred from engine operation. In an alternate embodiment, temperature Tcat1 is provided by temperature sensor 124.

Continuing with FIG. 2, engine 10 is shown with an intake camshaft 130 and an exhaust camshaft 132, where camshaft 130 actuates both intake valves 52a,b and camshaft 132 actuates both exhaust valves 54a,b. The valves can be actuated via lift profiles on the camshafts, where the lift profiles between the different valves may vary in height, duration, and/or timing. However, alternative camshaft (overhead and/or pushrod) arrangements could be used, if desired.

As described above, FIG. 2 merely shows one cylinder of a multi-cylinder engine, and that each cylinder has its own set of intake/exhaust valves, fuel injectors, spark plugs, etc. In an alternative embodiment, a port fuel injection configuration may be used where a fuel injector is coupled to intake manifold 44 in a port, rather than directly to cylinder 30.

Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 may operate in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or variable valve timing or controlling which and a number of intake and/or exhaust valves that are active) is adjusted based on a desired air-fuel ratio and the air-fuel ratio from the sensor. Further still, individual cylinder air-fuel ratio control could be used, if desired.

Combustion in engine 10 can be of various types/modes, depending on operating conditions. In one example, spark ignition (SI) can be employed where the engine utilizes a sparking device, such as spark plug coupled in the combustion chamber, to regulate the timing of combustion chamber gas at a predetermined time after top dead center of the expansion stroke. In one example, during spark ignition operation, the temperature of the air entering the combustion chamber is considerably lower than the temperature required for auto-ignition. While SI combustion may be utilized across a broad range of engine torque and speed it may produce increased levels of NOx and lower fuel efficiency when compared with other types of combustion.

Another type of combustion that may be employed by engine 10 uses homogeneous charge compression ignition (HCCI), or controlled auto-ignition (CAI), where auto-ignition of combustion chamber gases occurs at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

In compression ignition operation mode, it may be desirable to exercise close control over the timing of auto-ignition. The initial intake charge temperature directly affects the timing of auto-ignition. The start of ignition is not directly controlled by an event such as the injection of fuel in the standard diesel engine or the sparking of the spark plug in the spark ignited engine. Furthermore, the heat release rate is not controlled by either the rate or duration of the fuel-injection process, as in the diesel engine, or by the turbulent flame propagation time, as in the spark-ignited engine.

Note that auto-ignition is also a phenomenon that may cause knock in a spark-ignited engine. Knock may be undesirable in spark-ignited engines because it enhances heat transfer within the cylinder and may burn or damage the piston. In controlled compression ignition operation, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically may be increased to reach auto-ignition conditions at or near the end of the compression stroke. It will be appreciated by those skilled in the art that numerous other methods may be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbo-charging and supercharging), changing the auto-ignition characteristics of the fuel provided to the engine, and heating the intake air charge (external EGR).

During HCCI combustion, auto-ignition of the combustion chamber gas may be controlled to occur at a desired position of the piston or crank angle to generate desired engine torque, and thus it may not be necessary to initiate a spark from a sparking mechanism to achieve combustion. However, a late timing of the spark plug, after an auto-ignition temperature should have been attained, may be utilized as a backup ignition source in the case that auto-ignition does not occur.

Note that a plurality of other parameters may affect both the peak combustion temperature and the required temperature for efficient HCCI combustion. These and any other applicable parameters may be accounted for in the routines embedded in engine controller 12 and may be used to determine optimum operating conditions. For example, as the octane rating of the fuel increases, the required peak compression temperature may increase as the fuel requires a higher peak compression temperature to achieve ignition. Also, the level of charge dilution may be affected by a variety of factors including both humidity and the amount of exhaust gases present in the intake charge. In this way, it is possible to adjust engine parameters to compensate for the effect of humidity variation on auto-ignition, i.e., the effect of water makes auto-ignition less likely.

In one particular example, auto-ignition operation and combustion timing may be controlled by varying intake and/or exhaust valve timing and/or lift to, for example, adjust the amount of residual trapped gasses. Operating an engine in HCCI using the gas trapping method can provide fuel-efficient combustion with extremely low engine out NOx emissions.

However, the achievable HCCI window of operation for low speed and/or low load may be limited by the temperature of the previous cycle's trapped exhaust gas. That is, if the temperature of the trapped gas is too low, then HCCI combustion may not be possible at the next combustion event. If it is necessary to switch out of HCCI and into spark ignition mode during low load in which temperatures may fall too low, especially scenarios such as a gear changes, and then to return back into HCCI operation once the gear change is complete, there may be penalties for emissions and fuel economy and possible torque/NVH disruption to the driver during each switch. Therefore, in one embodiment, a method that enables continuous operation in HCCI at low speeds and loads, even if only to cover short periods, is described herein utilizing an alternative torque source, such as an alternator or hybrid motor element. Furthermore, extending the low load limit of HCCI operation, for as many cycles as possible, to obtain increased benefit from HCCI operation may be highly desirable.

While one or more of the above combustion modes may be used in some examples, still other combustion modes may be used, such as stratified operation, either with or without spark initiated combustion.

Figure 3:
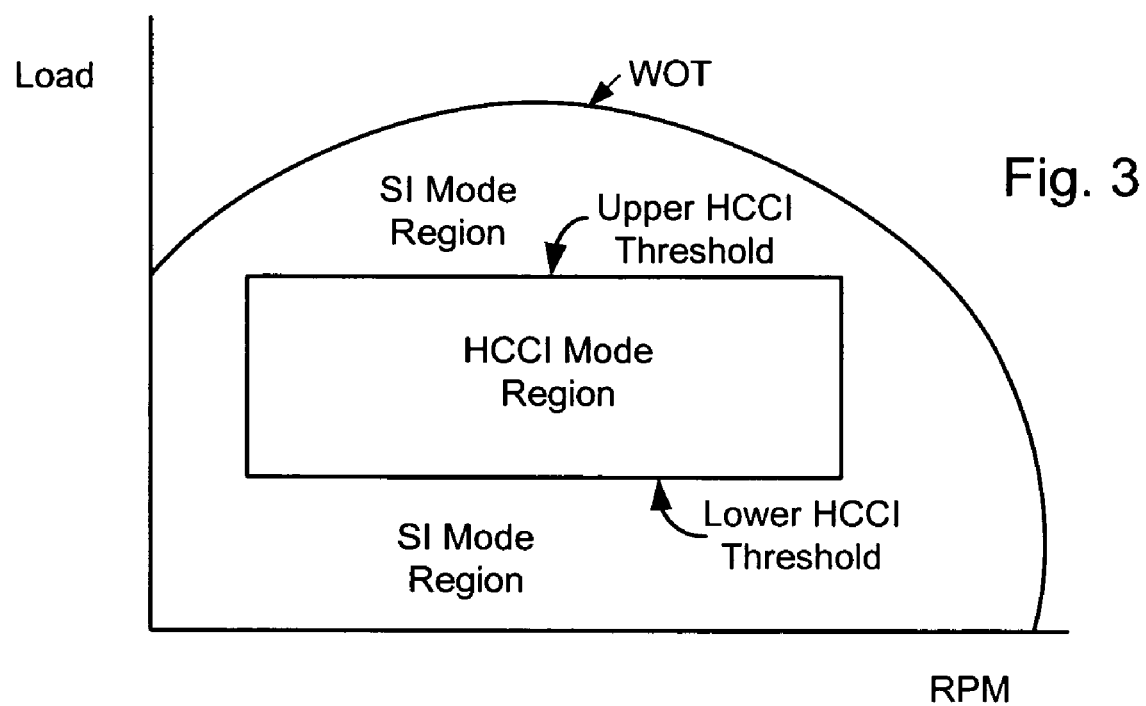
FIG. 3 is a graph showing a comparison of an HCCI combustion mode region and an SI combustion mode region.

FIG. 3 shows a graph comparing the SI and HCCI combustion mode regions to wide open throttle (WOT) for an example engine. The graph of FIG. 3 shows engine speed as revolutions per minute (RPM) plotted on the horizontal axis and engine load plotted on the vertical axis. The operating region of the engine described in FIG. 3 is shown to be contained below the WOT curve. The HCCI region is shown centrally located within the engine operating region and the SI region is shown occupying the higher load regions and the lower load regions surrounding the HCCI region. Further, the HCCI region is shown bounded by an upper output threshold and a lower output threshold. It should be appreciated that FIG. 3 shows just one example of the HCCI operating region as other configurations are possible. Furthermore, it should be understood that the HCCI operating region may differ substantially depending on engine configuration and/or engine operating conditions. While FIG. 3 shows example regions for different engine combustion modes, this is just one illustration for example purposes. In one alternative embodiment, the upper and lower HCCI thresholds in particular do not necessarily have a constant load value for increasing RPM, but may be variable.

Further, while only two combustion modes are shown in FIG. 3, the engine may operate with more than two combustion modes. Further, the curves of FIG. 3 may represent a single cylinder or groups of cylinders, and thus may vary depending on the number of cylinders deactivated, the number of cylinders combusting, and the mode of the combusting cylinders in the case that some of the cylinders are operating concurrently in different combustion modes.

The operating regions described by FIG. 3 show how an engine or cylinder can be configured to operate in an SI mode when the engine load is higher or lower than the HCCI region. As shown in FIG. 3, the engine or cylinder may operate in an HCCI mode when the engine output is greater than the lower HCCI threshold and/or less than the upper HCCI threshold. For example, as the requested wheel output decreases, the engine load may decrease such that the engine approaches the lower limit of the HCCI region. As engine load is further decreased, the engine or cylinder may transition from HCCI mode to SI mode as the engine load becomes less than the lower HCCI threshold, so that reliable combustion may be achieved. Likewise, the engine or cylinder may transition from SI mode to HCCI mode as the engine load again increases above the lower HCCI threshold.

Alternatively, under some operating conditions, a supplemental torque apparatus may be used to supply and/or absorb torque so that one or more cylinders may stay within the HCCI operating region, yet the desired torque output may still be achieved. Such operation is described in more detail herein with regard to FIG. 4, for example.

As noted above, the engine may include a plurality of cylinders and be configured to deactivate one or more of the combustion cylinders. For example, as requested torque is decreased, cylinders may be progressively deactivated. Alternatively, a bank of cylinders may be deactivated. Accordingly, a traction motor or other supplemental torque source may be used to supply some, all, or none of the wheel output during a cylinder deactivation operation, along with appropriate selection of combustion mode.

As noted above, deactivation of a cylinder can include stopping fuel delivery to the cylinder for one or more engine cycles and/or holding cylinder intake and/or exhaust valves closed for one or more engine cycles, for example.

During transitions between combustion modes, engine operating conditions may be adjusted as needed so that combustion is achieved in the desired mode. For example, in some embodiments, a transition from SI mode to HCCI mode may include increasing the temperature of the intake air entering the combustion chamber to achieve autoignition of the air and fuel mixture. Likewise, during transitions from HCCI mode to SI mode, the intake air temperature may be reduced so that engine knock does not occur or is reduced. Thus, transitions between combustion modes may use adjustments of, and be based on, engine operating conditions. Engine operating conditions may include intake air temperature, ambient conditions, EGR contribution, turbocharging or supercharging conditions, intake and/or exhaust valve timing and/or lift, the number of cylinders activated/deactivated, the driver requested output, a condition of the energy storage device, such as battery state of charge (SOC), a condition of a fuel vapor purging system, engine temperature, and/or fuel injection timing, combinations thereof, among others. The engine operating conditions listed above are just some of the many parameters that may be adjusted during operation of the engine and during transitions between combustion modes, or parameters that may be used to trigger such transitions. It should be appreciated that other factors may influence the operation of the engine and vehicle propulsion system.

As described above transitions between combustion modes may be difficult under some conditions. Thus, it may be desirable to reduce transitions between combustion modes under some conditions. An engine configured in a hybrid propulsion system or with an adjustable alternator as described above with reference to FIG. 1 may be used to reduce the frequency of transitions between combustion modes and/or between the number of cylinders active or deactivated, especially during transmission shifting operation or idle conditions. In some embodiments, an energy storage device may be used to absorb excess output produced by the engine. For example, a first portion of the engine output may be delivered and a second portion of the engine output may be absorbed by an energy storage device such as a motor coupled to a battery or an alternator. In this manner, one or more cylinders of the engine may operate in an HCCI mode when the wheel or engine output is less than a lower HCCI torque threshold. Likewise, when wheel output is greater than an upper HCCI threshold, a motor may be used to provide a supplemental output so that the engine output may remain below the upper HCCI threshold while still meeting total torque requirements. Therefore, one or more cylinders of the engine may continue operating in HCCI mode as long as a sufficient amount of stored energy is available to operate the motor to produce the additional wheel output. While torque may be used as a parameter for engine output, various others may also be used, such as a power, and/or a speed, etc.

Figure 4:
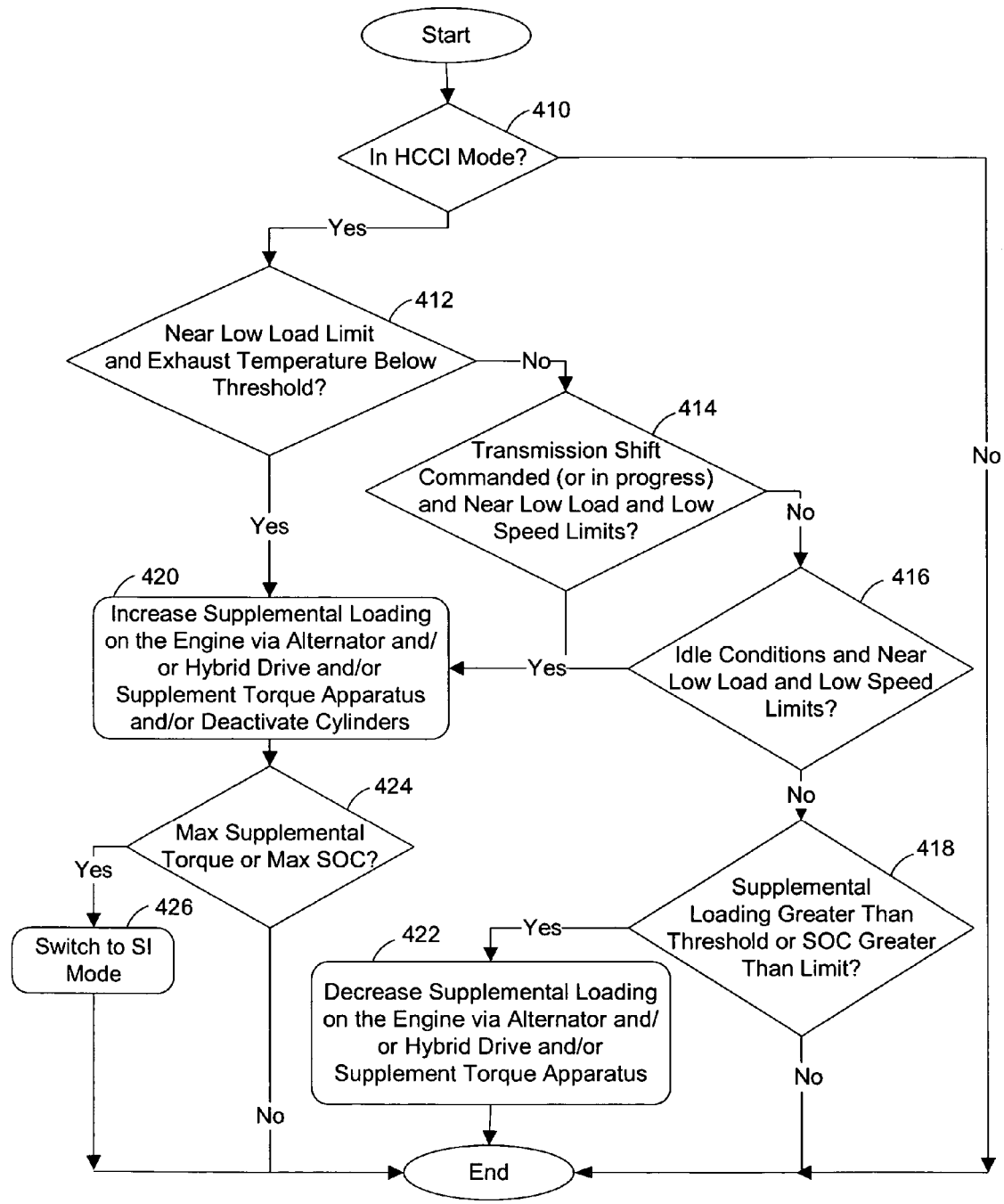
FIG. 4 shows a high level flow chart of an example routine for controlling engine and vehicle operation.

Referring now to FIG. 4, a routine is described for controlling combustion mode during selected operating conditions. In one example, the routine selectively raises the temperature of combustion during HCCI operation by increasing the loading on the engine via an alternator or other supplemental torque apparatus to extend HCCI operation in one or more cylinders of the engine. Such operation would allow an extremely fast increase in engine load to enable continued operation in HCCI, when required. The extension of HCCI operation may be especially useful during short periods of low speed and/or low load operation (such as during a transmission gear change) to prevent the necessity to switch one or more cylinders into spark ignition mode temporarily (during the gear change) and then to switch back into HCCI. Furthermore, during steady state low speed and/or low load operation (for example at idle speed), the loading on the engine might be too low to allow operation in HCCI for all cylinders since the minimum combustion temperature may not be reached. However by increasing the load on the alternator and hence the temperature of combustion, this would then allow one ore more cylinders to operate in HCCI mode at idle speed.

In order to take advantage of supplemental loading in some examples, such as using an adjustable charging alternator, an alternator loading strategy may be used that loads the engine by adding charge into the battery. In this way, it may be possible to capture energy from the additional fuel used and store it in the battery for future use. To achieve this, the battery may be regulated in a partial state of charge so that there is spare capacity to add charge when extra alternator loading is used.

Referring now specifically to FIG. 4, in 410, the routine determines whether one or more engine cylinders is currently operating in HCCI mode. If not, the routine ends. Otherwise, the routine continues to 412 to determine whether the cylinders in the HCCI mode are near a low speed and/or low load limit and the exhaust temperature is below a threshold value. If not, the routine continues to 414 to determine whether a transmission shift is commanded (or in progress) and one or more cylinders in the HCCI mode are near a low speed and/or low load limit. If not, the routine continues to 416 to determine whether idle speed control is currently active (e.g., feedback adjustment of engine output based on engine speed to maintain idle conditions) and one or more cylinders in the HCCI mode are near a low speed and/or low load limit.

Note that the transmission gear change of 414 may be caused by various conditions. For example, the gear change may be requested due to a change in a driver request or other operator input. Further, it may be requested due to variation of operating conditions, such as vehicle speed, engine speed, temperature, etc. As such, a transmission gear change may occur even when the driver request is relatively constant.

Continuing with FIG. 4, if the answer to 412, 414, or 416 is yes, the routine continues to 420 where supplemental loading of the engine or powertrain is increased via an alternator or hybrid drive or supplemental torque apparatus. In addition, or alternatively, the routine may deactivate one or more cylinders. In this way, the engine load of individual cylinders in the HCCI combustion mode may be increased, while still providing the desired engine output. In other words, a supplemental torque apparatus absorbs excess engine torque, and stores the excess energy in a storage device, such as a battery, for example. From 420, the routine continues to 424 to determine whether a maximum supplemental loading is already being applied, and/or whether a maximum battery SOC is present.

If the answer to 424 is yes, the routine continues to 426 to switch one or more cylinders to SI combustion. Otherwise, the routine continues to the end.

If the answers to 412, 414, and 416 are no, the routine continues to 418 to determine whether supplemental loading is greater than a threshold or whether battery SOC is greater than a limit value. If not, the routine ends. Otherwise, the routine continues to 422 to decrease supplemental loading on (and possibly supply supplemental torque to) the engine via an alternator and/or hybrid drive and/or supplement torque apparatus.

In this way, an appropriate number of cylinders may be activated and an increase/decrease in supplemental torque may be achieved to extend HCCI operation during temporary or longer duration low speed and low load conditions. Also, by considering the energy storage conditions, such as a battery SOC, it may be possible to better utilize combustion modes and store energy in an efficient manner.

Note that the control routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. As another example, various other mechanisms may be used in a system using two different valve profiles for each of the valves in a cylinder, and the selective deactivation of one or more valves to provide the correct flow conditions for compression or auto-ignition combustion. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine and a supplemental torque apparatus of a vehicle having a transmission coupled to the engine, comprising:
   operating at least one cylinder with auto-ignition combustion;
   responsive to a transient gear change where the engine temporarily encounters a low load and low speed operating condition, increasing loading on the engine via the supplemental torque apparatus; and
   maintaining operation of the at least one cylinder with the auto-ignition combustion during the transient gear change.

2. The method of claim 1 where said increased loading is performed based on an amount of stored energy.

3. The method of claim 1 where said increased loading is performed when a battery state of charge is less than a threshold value.

4. The method of claim 1 further comprising deactivating another cylinder of the engine during said transient low load and low speed operating condition.

5. The method of claim 1 wherein the supplemental torque apparatus is an alternator.

6. The method of claim 3 further comprising responsive to another transient low load and low speed operating condition, transitioning the at least one cylinder to spark ignition operation when the battery state of charge is above the threshold value.

7. The method of claim 1 wherein said increasing of loading on the engine via the supplemental torque apparatus includes temporarily increasing said loading.

8. The method of claim 7 wherein said temporary increase of loading includes increasing said loading substantially coincident with said gear change.

9. A method for controlling an engine and a supplemental torque apparatus of a vehicle, comprising:
   operating at least one cylinder with auto-ignition combustion; and
   during at least an interval of an idle speed control operating condition and when a battery state of charge is less than a threshold value, increasing loading on the engine via the supplemental torque apparatus so that the at least one cylinder may remain operating with the auto-ignition combustion;
   responsive to a transient gear change where the engine temporarily encounters a low load and low speed operating condition and when the battery state of charge is less than said threshold value, increasing loading on the engine via the supplemental torque apparatus; and
   maintaining operation of the at least one cylinder with the auto-ignition combustion during the transient gear change.

10. The method of claim 9 further comprising deactivating another cylinder of the engine during said transient low load and low speed operating condition.

11. The method of claim 10 wherein the supplemental torque apparatus is an alternator.

12. The method of claim 11 further comprising during another transient low load and low speed operating condition, transitioning the at least one cylinder to spark ignition operation when said battery state of charge is above the threshold value.

13. The method of claim 12 wherein said increasing of loading on the engine via the supplemental torque apparatus includes temporarily increasing said loading.

14. The method of claim 13 wherein said temporary increase of loading includes increasing said loading substantially coincident with said gear change.

15. A system for a vehicle on a road, comprising:
an internal combustion engine;
a supplemental torque apparatus configured to supply torque to or absorb torque from the engine;
an energy storage device coupled to said supplemental torque apparatus;
a transmission coupling the engine to the road; and
a controller configured to
operate at least one cylinder with auto-ignition combustion;
adjust a gear of the transmission based at least on a driver input and an operating condition;
responsive to the gear adjustment, increase loading on the engine via the supplemental torque apparatus; and
maintain operation of the at least one cylinder with the auto-ignition combustion during the gear adjustment.

16. The system of claim 15 wherein said controller causes said gear adjustment due to variation in said operating condition, and said operating condition includes a speed.

17. The system of claim 16 wherein during said gear adjustment, the controller is further configured to detect the engine temporarily operating in a load below a low load threshold and a speed below a low speed threshold.

18. The system of claim 15 wherein said controller is further configured to increase said loading based on a condition of said energy storage device.

19. The system of claim 18 wherein said energy storage device is a battery and said condition is a battery state of charge.

20. The system of claim 19 wherein said controller is further configured to adjust a gear change in response to said driver input.

* * * * *